March 17, 1970  J. C. ABROMAVAGE ET AL  3,501,123
ADJUSTABLE MIRROR

Filed May 23, 1967  2 Sheets-Sheet 1

INVENTOR.S
JOHN C. ABROMAVAGE
HARRY J. REICHARDT
BY
Semmes & Semmes
ATTORNEYS

March 17, 1970  J. C. ABROMAVAGE ET AL  3,501,123
ADJUSTABLE MIRROR
Filed May 23, 1967  2 Sheets-Sheet 2
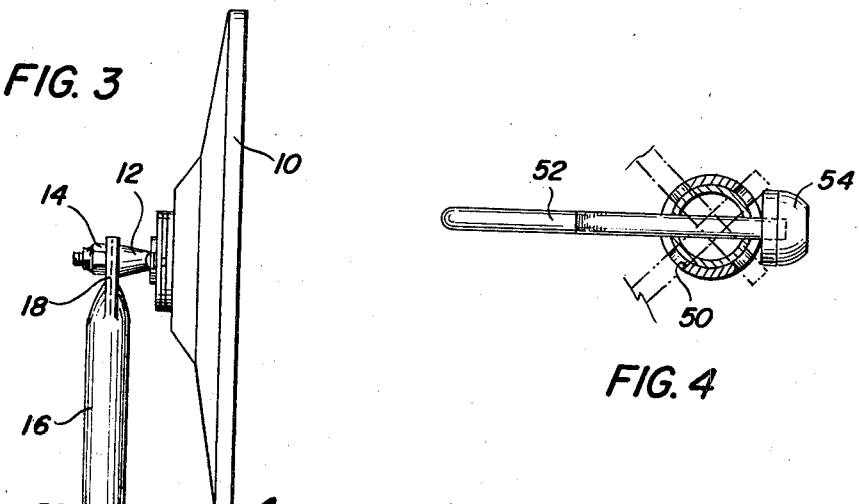
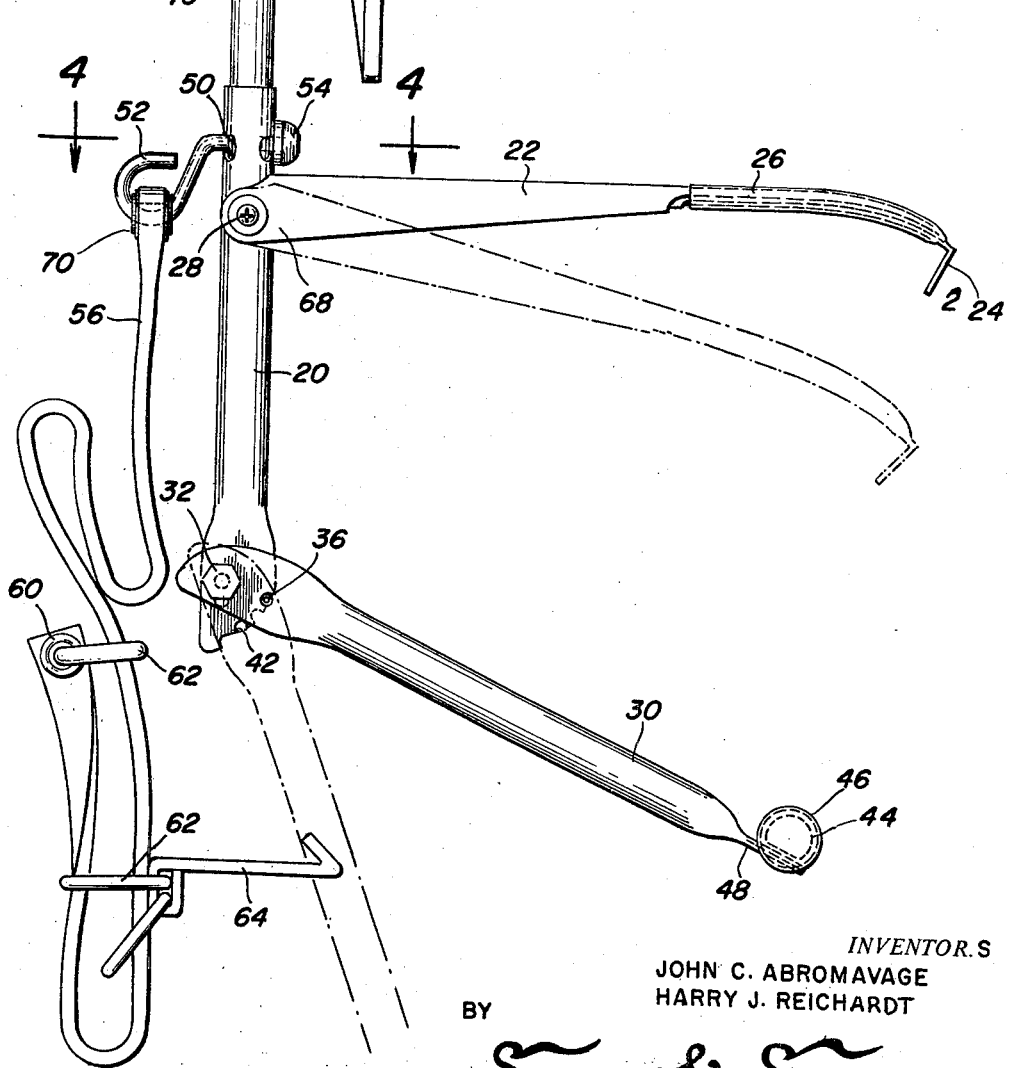
INVENTOR.S
JOHN C. ABROMAVAGE
HARRY J. REICHARDT
BY
Semmes & Semmes
ATTORNEYS

United States Patent Office 3,501,123
Patented Mar. 17, 1970

3,501,123
ADJUSTABLE MIRROR
John C. Abromavage, Jamison, and Harry J. Reichardt, Philadelphia, Pa., assignors to Arcoa, Incorporated, Portland, Oreg., a corporation of Oregon
Filed May 23, 1967, Ser. No. 640,702
Int. Cl. B60r 1/06
U.S. Cl. 248—487         4 Claims

ABSTRACT OF THE DISCLOSURE

An adjustable rear view mirror of the type attachable to an auto door by a temporary clamp and flexible strap means, such as used in the auto rental industry. Improvements consist in the provision of an adjustable dog-leg extension, abutting the car door, for regulation of the height of the mirror with respect to the auto window.

---

The present application relates to an adjustable rear view mirror of the type which may be readily affixed to any type vehicle.

This invention is an improvement upon assignee's rear view mirror support (Patent 3,186,672).

In the trailer rental industry there has been widespread development in rear view mirrors of the type which could be attached by an inexperienced person to any type of vehicle. Improvements in the present invention consist in the provision of an adjustable dog-leg extension abutting the car door for regulation of the height of the mirror with respect to the window. This capability is not present in the prior art, for example, Patent No. 3,260,490. Also, detent means are provided for laterally rotating and locking the rear view mirror within a 90° arc and the tensioning member extending from the support base to the car door bottom is longitudinally adjustable so as to fit any height auto door.

Accordingly, it is an object of invention to provide a readily installed auto rear view mirror with improved adjustment features, enabling rapid and accurate mounting on any type of auto door.

Yet additional objects of invention will become apparent from the ensuing specification and attached drawings wherein:

FIG. 3 is a side elevation, showing a phantom adjustable positioning of the auto window top clamp and the bottom dog-leg extension, abutting the auto door;

FIG. 4 is a sectional view taken along section line 4—4 of FIG. 3 and showing the adjustability of eye pin 52 and the mirror support piece 16 with respect to detents 50 in base 20.

Figure 1:
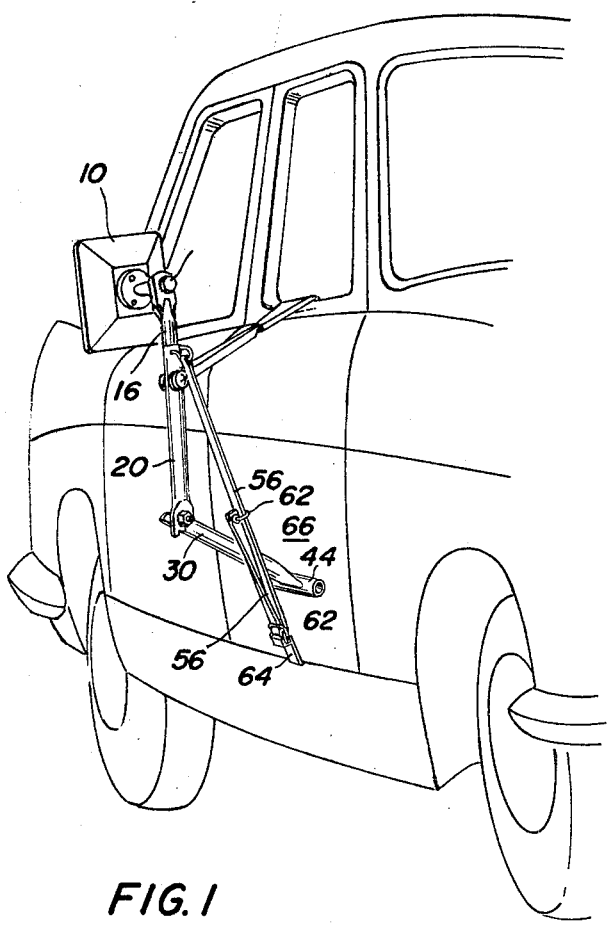
FIG. 1 is a fragmentary perspective view of the mirror installed upon a car door.
Figure 2:
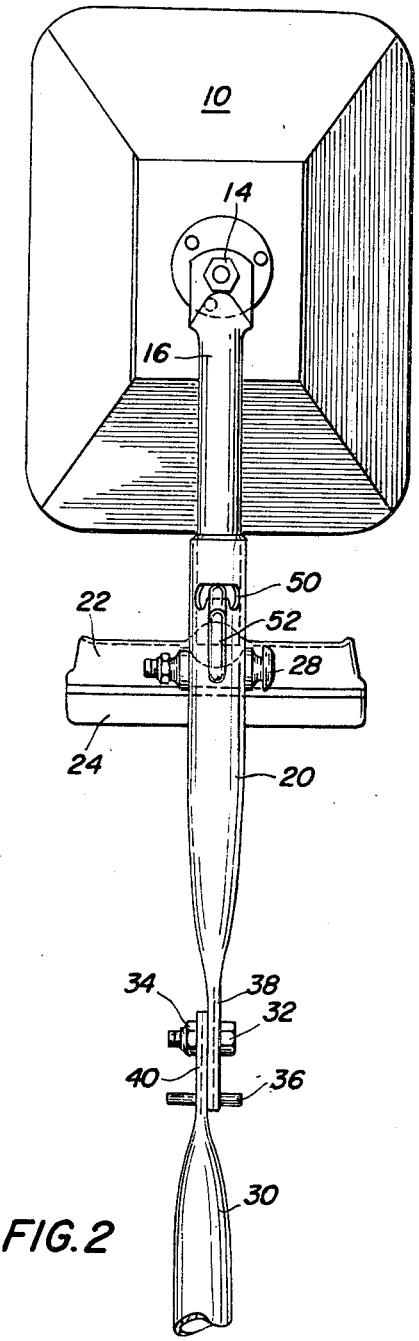
FIG. 2 is an enlarged fragmentary rear elevation of the mirror, mirror support piece and dog-leg extension.

In FIG. 1, a rectangular, conventional rear view auto mirror is shown as mounted upon ball socket piece 12 secured to flattened portion 18 by means of lock nut 14. Mirror support piece 16 is laterally rotatably adjusted in base 20 by means of eye pin 52 which extends through support piece 16 and is securable in adjusting holes or detents 50 so as to lock the mirror adjustably within a 90° arc. Auto window channel clamp 22, having a down turned end portion 24 for extension into the auto window channel and vinyl or like resilient cover 26 is pivoted to base 20 by means of Philips-type truss head machine screw 28. This machine screw 28 extends through the bifurcated end 68 of clamp 22 and support base 20 and is secured thereto by means of a lock nut or the like. The auto door engaging bumper or dog-leg extension 30 is pivoted at its flattened end portion 40 to a corresponding flattened end portion 38 at the bottom of base 20 by means of machine bolt 32 and lock nut 34.

As illustrated in FIG. 3, flattened end portion 38 includes a series of detents 42 into which dog-leg extension roll pin 36 is lockable so as to lock the dog-leg in various off-set attitudes with respect to support 20. Consequently, the adjustment of the dog-leg extension enables one to regulate the height of mirror 10 with respect to the auto window. Dog-leg extension 30 has a laterally extending door-engaging bumper 44 secured to its flattened end portion 48 by means of rivets (not illustrated) or the like. Bumper 44 may have a vinyl or like cover 46 or rubber pad cushions may be fitted to either end.

Flat rubber strap tensioning member 56 is secured by a grommet 70 to eye pin 52. An auto door bottom engaging clamp 64 is secured to the end of strip 56 by means of D rings 62. D rings 62 also enable longitudinal adjustment of strap 56 for securement of the device rigidly to an auto door of any height. Clamp 64 may have a vinyl or like resilient cover so as to avoid marring the bottom of the auto door.

As will be apparent, the present mirror provides for constant vertical adjustability of the mirror regardless of the height of the auto door, together with corresponding adjustability of the tensioning member and positive locking of the mirror in a plurality of lateral attitudes. All these adjustment features are accomplished simply and without necessity for elaborate installation or adjustment mechanisms.

Manifestly, various modifications in the dog-leg extension, mirror lateral adjustment detent and longitudinal adjusting features in the flexible auto door bottom engaging strap may be employed without departing from the spirit and scope of invention.

We claim:
1. A rear view mirror comprising:
 (A) a supporting base;
 (B) a bumper pivoted to the lower end of said base as a dog-leg extension and having a bumper end engaging the auto door, said bumper including
   (1) a bumper end engaging the auto door; and
   (2) lock pin means extending through said bumper and engageable with detents in said base, so as to selectively lock said bumper in an offset position with respect to said base;
 (C) a rear view mirror adjustably connected to the upper end of said supporting base;
 (D) a clamp pivoted at one end medially of said base and extending to one side thereof; and
 (E) a bottom clamp flexibly depending from said supporting base via a longitudinally adjustable strap and thereby being adjustable with respect to the auto door bottom.

2. A rear view mirror as in claim 1, said bumper including at its lower end a laterally extending door-engaging piece.

3. A rear view mirror as in claim 2, said laterally extending door-engaging piece being resiliently cushioned on its exterior.

4. A rear view mirror comprising:
 (A) a supporting base;
 (B) a bumper pivoted to the lower end of said base as a dog-leg extension and having
   (1) a bumper end engaging the auto door;
   (2) a lock pin extending through said bumper and engageable with detents in said base, so as to selectively lock said bumper in an offset position with respect to said base;
 (C) a rear view mirror adjustably connected to the upper end of said supporting base; and
 (D) a clamp pivoted at one end medially of said base and extending to one side thereof; and (E) a bottom clamp attached to a longitudinally adjustable flexible strap depending from said supporting base independently of said bumper.

References Cited
UNITED STATES PATENTS

| | | | | |
|---|---|---|---|---|
| 3,142,469 | 7/1964 | Clemmer | | 248—226 |
| 3,166,283 | 1/1965 | Farnsworth | | 248—480 |
| 3,172,633 | 3/1965 | Allen | | 248—226 |
| 3,186,672 | 6/1965 | Weder | | 248—480 |
| 3,228,643 | 1/1966 | Shilling | | 248—226 |
| 3,260,490 | 7/1966 | Trautner | | 248—480 |

ROY D. FRAZIER, Primary Examiner

F. DOMOTOR, Assistant Examiner

U.S. Cl. X.R.

248—226